United States Patent
Yeo et al.

(10) Patent No.: US 7,548,225 B2
(45) Date of Patent: *Jun. 16, 2009

(54) LIQUID CRYSTAL DISPLAY DEVICE AND METHOD FOR FABRICATING THE SAME

(75) Inventors: Ju Chun Yeo, Kyonggi-do (KR); Hoon Jeong, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 401 days.

This patent is subject to a terminal disclaimer.

(21) Appl. No.: 11/453,083

(22) Filed: Jun. 15, 2006

(65) Prior Publication Data

US 2006/0232739 A1 Oct. 19, 2006

Related U.S. Application Data

(62) Division of application No. 10/017,426, filed on Dec. 18, 2001, now Pat. No. 7,088,323.

(30) Foreign Application Priority Data

Dec. 21, 2000 (KR) .............................. 2000-79592
Nov. 28, 2001 (KR) .............................. 2001-74579

(51) Int. Cl.
*G09G 3/36* (2006.01)

(52) U.S. Cl. ........................... 345/87; 345/92; 349/139; 349/151

(58) Field of Classification Search ............... 345/87, 345/90, 92, 98–100, 204–205, 214; 349/43, 349/106, 147–153, 138–139
See application file for complete search history.

(56) References Cited

U.S. PATENT DOCUMENTS

| 5,574,582 | A  |   | 11/1996 | Takeda et al. |
| 5,757,450 | A  | * | 5/1998  | Fujii et al. .................. 349/106 |
| 6,052,171 | A  | * | 4/2000  | Kawaguchi ................. 349/149 |
| 6,522,378 | B1 | * | 2/2003  | Mizuno et al. .............. 349/139 |
| 6,618,111 | B1 | * | 9/2003  | Nagata et al. ............... 349/149 |
| 6,683,669 | B1 | * | 1/2004  | Fujikawa .................... 349/149 |
| 2002/0030648 | A1 | * | 3/2002 | Yamamoto et al. ............ 345/87 |

FOREIGN PATENT DOCUMENTS

| JP | 06-332000 | 2/1994 |
| JP | 06-202153 | 7/1994 |
| JP | 08-076136 | 3/1996 |

(Continued)

*Primary Examiner*—Richard Hjerpe
*Assistant Examiner*—Mansour M Said
(74) *Attorney, Agent, or Firm*—McKenna Long & Aldridge LLP

(57) ABSTRACT

A liquid crystal display (LCD) device and a method for fabricating the same is disclosed in which deterioration of picture image resulting from different lengths of interconnection lines is compensated with a capacitor having a layered structure. To this end, interconnection line part for applying a signal from a driving integrated circuit to an LCD panel is formed with different thickness, or a conductive layer is formed on a substrate of the interconnection line part so that a center portion of the conductive layer is wider than an outer portion of the conductive layer.

32 Claims, 14 Drawing Sheets

FOREIGN PATENT DOCUMENTS

| | | |
|---|---|---|
| JP | 08-271927 | 10/1996 |
| JP | 11-38445 | 2/1999 |
| JP | 11-190856 | 7/1999 |
| JP | 2000-005624 | 1/2000 |
| JP | 2000-162628 | 6/2000 |
| KR | 2001-28531 | 4/2001 |

* cited by examiner data line or gate line

LIQUID CRYSTAL DISPLAY DEVICE AND METHOD FOR FABRICATING THE SAME

This application is a Divisional of prior application Ser. No. 10/017,426, filed Dec. 18, 2001 now U.S. Pat. No. 7,088,323.

This application claims the benefit of the Korean Application Nos. P2000-079592 filed on Dec. 21, 2000 and P2001-74579 filed on Nov. 28, 2001, which are hereby incorporated by reference as if fully set forth herein.

BACKGROUND OF THE INVENTION

1. Field of the Invention

The present invention relates to a liquid crystal display (LCD) device, and more particularly, to an LCD device and a method for fabricating the same which compensates for a deteriorated picture image caused by a difference of length between a gate interconnection line and a data interconnection line with a capacitor having a layered structure.

2. Discussion of the Related Art

Generally, a module of an LCD device is divided into two types according to a method for mounting a driving integrated circuit (IC). One type is called 'Chip On Glass' (COG) type, and the other is called 'Tape Automated Bonding' (TAB) type.

In the COG type, a driving IC is directly mounted to a gate region and a data region of an LCD panel so that an electrical signal is transmitted to the LCD panel. At this time, anisotropic conduction film (ACF) is generally used to attach the driving IC to an LCD panel.

In the TAB type, 'tape carrier package' (TCP) to which a driving IC is mounted is connected to an LCD panel and a printed circuit board (PCB). When a TCP is connected to an LCD panel, anisotropic conduction film (ACF) is used instead of lead because of particular material characteristics of a glass and a metal and because a pitch corresponding to 0.2 mm or below is very precise. On the other hand, when a TCP is connected to a PCB, lead is used. However, as to the latter case, it is also anticipated that ACF will be used in the future according to a trend of a precise pitch.

Hereinafter, a related art LCD device will be explained with reference to the accompanying drawings.

FIG. 1 is a schematic view of a related art TFT-LCD module using a TAB type.

As shown in FIG. 1, an LCD device includes a plurality of data lines and gate lines crossing each other to define a pixel region; a first substrate 11 including thin film transistors (TFTs) at the crossing portions of the gate and data lines; a second substrate 12 on which a color filter layer and a common electrode are formed; a liquid crystal 13 injected between the first substrate 11 and second substrate 12; and planarization plates 14 respectively attached to outer sides of the first and second substrates 11 and 12 to form an LCD panel. A TCP 16 on which a gate or a data driving IC 17 is stacked is connected to each line of the first substrate 11 by an ACF 15, so that a signal is applied to gate lines or data lines of the first substrate 11. Herein, an unexplained numeral 18 is a PCB.

An interconnection line part to which the driving IC of the TCP and a TFT-LCD panel are connected will be explained as follows.

FIG. 2 illustrates a plan view of an interconnection line part to which the related art data drive IC and data lines of TFT-LCD are connected, and FIG. 3 is a detailed view showing the related art interconnection line part.

The width of each data line in a panel is generally wider than that of TAB pads to which a data drive IC is connected. Accordingly, the interconnection line part includes a straight line part 20 connected to the data drive IC with a constant interval in one direction; a slanted part 21 for connecting the straight line part 20 to each data line 22.

However, in the related LCD device, since the width of each data line in a panel is generally wider than that of TAB pads connected with a data drive IC, there is a difference in line length between interconnection lines formed between a center portion of the drive IC and an outer portion.

Because of the different line lengths of the interconnection lines, a difference in resistance between the respective interconnection lines as well as a difference in capacitance between common electrodes of the interconnection lines and the substrate is generated, thereby generating uneven picture image.

SUMMARY OF THE INVENTION

Accordingly, the present invention is directed to an LCD device and a method for fabricating the same that substantially obviates one or more problems due to limitations and disadvantages of the related art.

An advantage of the present invention is to provide an LCD device and a method for fabricating the same which compensates for the difference in a capacitance (a capacity of static electricity) due to a difference of a line length between interconnection lines.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an LCD device having an interconnection line part for applying a signal from a driving IC to an LCD panel includes a substrate; and a plurality of interconnection lines formed on the substrate of the interconnection line part, the interconnection lines being wider at a center portion than at an outer portion.

Herein, the respective interconnection line includes a first straight-line part to which the driving IC is connected; a second straight-line part connected to gate lines or data lines of an LCD panel; and a slanted part for connecting the first straight-line part with the second straight-line part. In this case, it is possible that only the first and second straight-line parts of the respective interconnection lines are thickly formed.

In another aspect of the present invention, an LCD device includes a plurality of interconnection lines for applying a signal from a driving IC to an LCD panel; and a plurality of supplementary conductive patterns formed between the respective interconnection lines to connect with the respective interconnection lines.

Herein, the supplementary conductive patterns are formed of the same materials as those of the gate lines or the data lines.

The supplementary conductive patterns connected to the interconnection lines have a larger size in a center portion than in an outer circumference portion.

In another aspect of the present invention, an LCD device having an interconnection line part for applying a signal from a driving IC to an LCD panel includes a substrate; a conductive layer formed on the substrate of the inter connection line part, having a wider area in a center portion than in an outer circumference portion; an insulating film formed on the entire substrate including the conductive layer; and a plurality of interconnection lines arranged to overlap the conductive layer on the insulating film in one direction.

Herein, capacitors are formed between the plurality of interconnection lines and the conductive layer, and the capacitance between the plurality of interconnection lines and the conductive layer is gradually increased towards a center portion from an outer circumference portion.

It is possible that a voltage for preventing static electricity is applied to the conductive layer.

A common voltage is applied to the conductive layer.

The conductive layer is formed of a semiconductor layer doped with impurities.

The conductive layer is formed in a roughly triangle shape, so that a center portion overlapped with the conductive layer is wider than an outer circumference portion.

The insulating film is a doubled structure of a gate insulating film and an interlayer insulating film.

It is possible that a plurality of supplementary lines electrically connected to the respective interconnection lines are further included.

The plurality of supplementary lines are formed of the same materials as those of the interconnection lines.

The interconnection lines are data interconnection lines.

The conductive layer is formed of the same material as that of a gate line.

In another aspect of the present invention, an LCD device having an interconnection line part for applying a signal from a driving IC to an LCD panel includes a substrate; a plurality of interconnection lines arranged on the substrate in one direction; an insulating film formed on the entire surface of the substrate including the plurality of interconnection lines; and a conductive layer formed on the substrate of the interconnection lines, having a wider area in a center portion rather than in an outer portion.

A method for fabricating a liquid crystal display (LCD) having a data interconnection line part for applying a signal from a driving IC to an LCD panel; and a cell array part in which a plurality of gate lines crossing a plurality of data lines are arranged to define a pixel region, and thin film transistors (TFTs) are formed at the crossing regions, includes forming a first active layer in an island shape in the region where the respective TFTs of the cell array part are formed, and forming a second active layer on the substrate, so that the data interconnection line part has a wider area in a center portion rather than in an outer portion; forming a gate insulating film on the entire surface including the first and second active layers; forming a plurality of gate lines on the first active layer with constant intervals in one direction to form a gate electrode; forming source and drain regions in the first active layer by impurity ion implantation using the gate electrode as a mask, and forming a conductive layer in the second active layer; forming an interlayer insulating film on the entire surface of the source and drain regions and forming a contact hole in the interlayer insulating film; and forming a plurality of data lines and interconnection lines, the data lines connected to the source and drain regions and formed substantially perpendicular to the gate lines, so that a capacitance of the interconnection lines with the second active layer is gradually increased towards a center portion from an outer portion.

Herein, it is possible that the step of forming a plurality of supplementary lines of the same material as that of the data interconnection lines is further included, so that the supplementary lines are electrically connected to the respective data interconnection lines.

In another aspect of the present invention, a method for fabricating the LCD device having a data interconnection line part for applying a signal from a driving IC to an LCD panel; and a cell array part in which a plurality of gate lines crossing a plurality of data lines are arranged to define a pixel region, and TFTs are formed at the crossing regions, includes forming a plurality of gate lines having gate electrodes in the region where the TFTs are formed, and simultaneously forming a gate metal pattern layer having a wider area in a center portion than in an outer portion; forming a gate insulating film on the entire surface including the gate line and the gate metal pattern layer; forming an active layer in an island shape in the region where the respective TFTs are formed; and forming a plurality of data lines and interconnection lines substantially perpendicular to the gate lines, so that source and drain electrodes are formed on both sides of the active layer, and a capacitance with the gate metal pattern layer is gradually increased towards a center portion from an outer portion.

In another aspect of the present invention, a method for fabricating the LCD device having a data interconnection line part for applying a signal from a driving IC to an LCD panel; and a cell array part in which a plurality of gate lines crossing a plurality of data lines are arranged to define a pixel region, and TFTs are formed at the crossing regions, includes forming an active layer in the region where the TFTs are formed; forming a gate insulating film on the entire surface of the substrate; forming a plurality of gate lines on the gate insulating film and forming a gate metal pattern layer in the data interconnection line part, so that a gate electrode is formed above the active layer and a center portion of the gate metal pattern is wider than an outer portion; forming an impurity region in the active layer by using the gate electrode as a mask, and forming an interlayer insulating film on the entire surface including the gate line and the gate metal pattern layer so as to form a contact hole in the impurity region; and forming a plurality of data and interconnection lines substantially perpendicular to the gate lines, so that source and drain electrodes are connected to the impurity region through the contact hole and a capacitance with the gate metal pattern layer is gradually increased towards a center portion from an outer circumference portion.

In another aspect of the present invention, a method for fabricating the LCD device having a gate interconnection line part for applying a signal from a driving IC to an LCD panel; and a cell array part in which a plurality of gate lines crossing a plurality of data lines are arranged to define a pixel region, and TFTs are formed at the crossing regions, includes forming an active layer in the region where the TFTs are formed; forming a gate insulating film on the entire surface of the active layer; forming a plurality of gate lines and gate interconnection lines on the gate insulating film so as to form a gate electrode on the active layer; forming an impurity region in the active layer by using the gate electrode as a mask; and forming an interlayer insulating film on the entire surface including the gate lines and the gate interconnection lines so as to form a contact hole in the impurity region; and forming a plurality of data lines substantially perpendicular to the gate lines so as to connect source and drain electrodes to the impurity region through the contact hole, and simultaneously forming a data metal pattern layer to overlap the gate interconnection lines, so that a center portion of the data metal pattern layer is wider than an outer portion.

In another aspect of the present invention, a method for fabricating the LCD device having a gate interconnection line part for applying a signal from a driving IC to an LCD panel; and a cell array part in which a plurality of gate lines crossing a plurality of data lines are arranged to define a pixel region and TFTs are formed at the crossing regions, includes forming a plurality of gate lines and gate interconnection lines having gate electrodes in the region where the TFTs are formed; forming a gate insulating film on the entire surface including the gate lines and the gate interconnection lines; forming an active layer in an island shape in the region where the respective TFTs are formed; and forming a plurality of data lines substantially perpendicular to the gate lines to form source and drain electrodes on both sides of the active layer, and simultaneously forming a data metal pattern layer to overlap the gate interconnection lines, so that a center portion of the data metal pattern layer is wider than an outer portion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

First Embodiment

Figure 1:
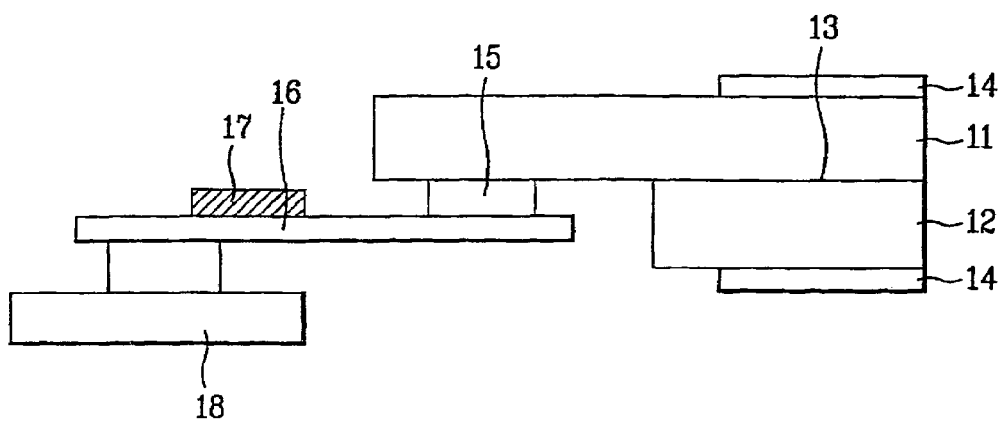
FIG. 1 illustrates a schematic view of a related art TFT-LCD module using a TAB type.
Figure 2:
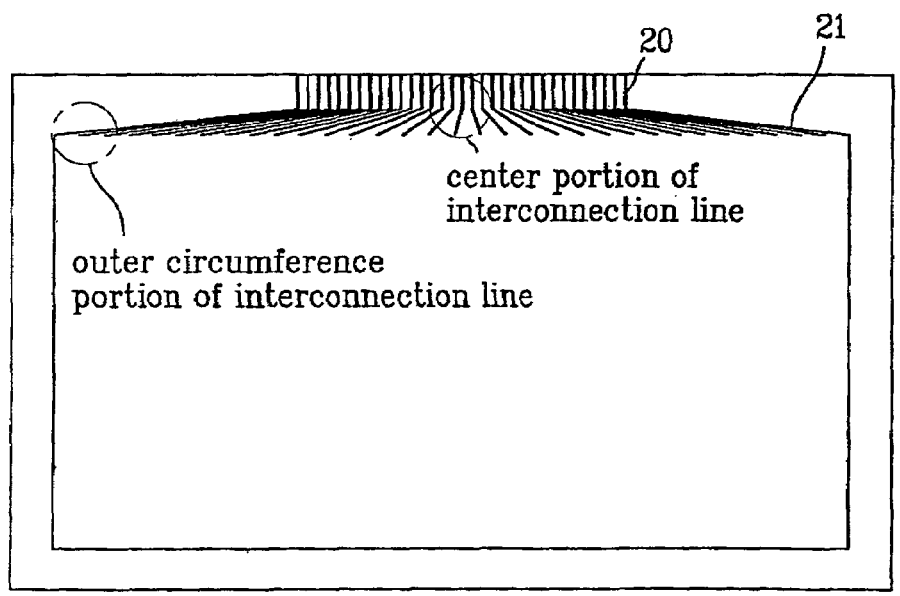
FIG. 2 illustrates a schematic plan view of an interconnection line part to which the related art data drive IC and data lines of TFT-LCD are connected.
Figure 3:
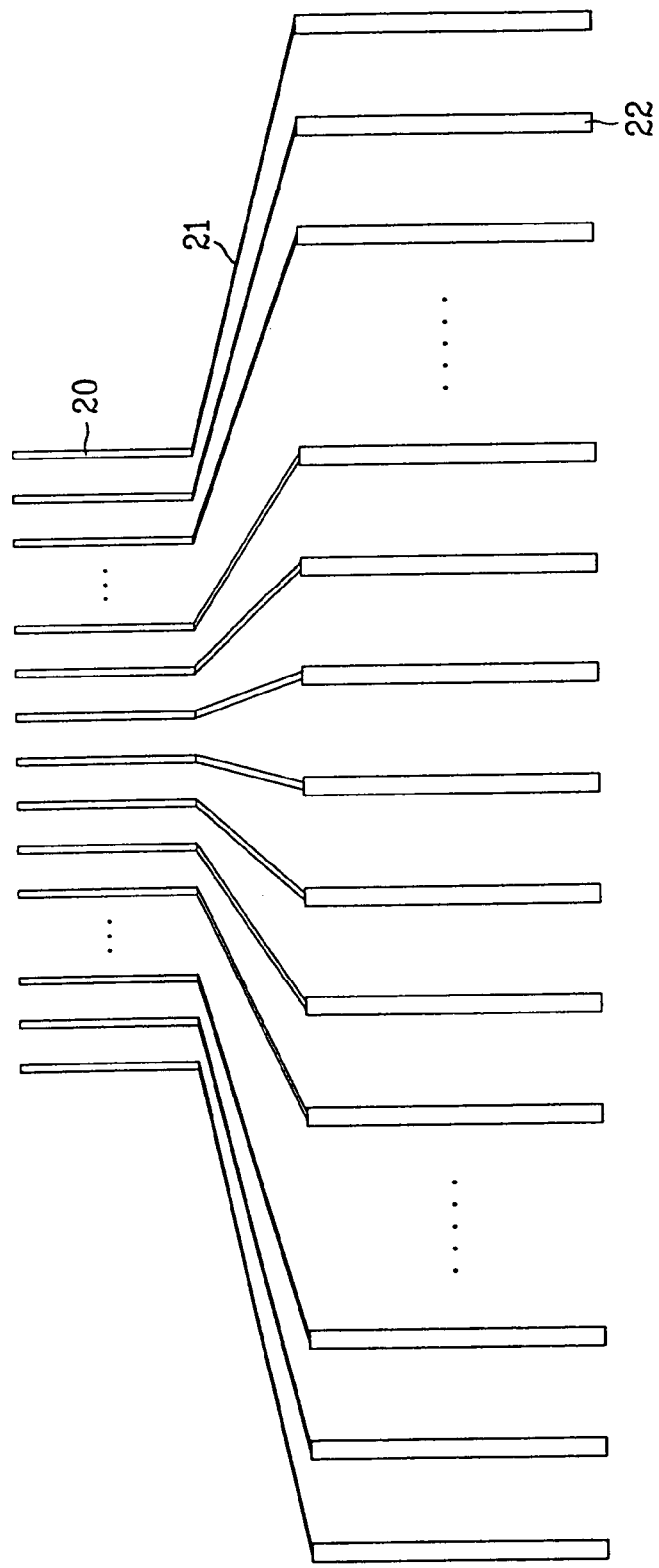
FIG. 3 is a detailed view showing the related art interconnection line part.
Figure 4:
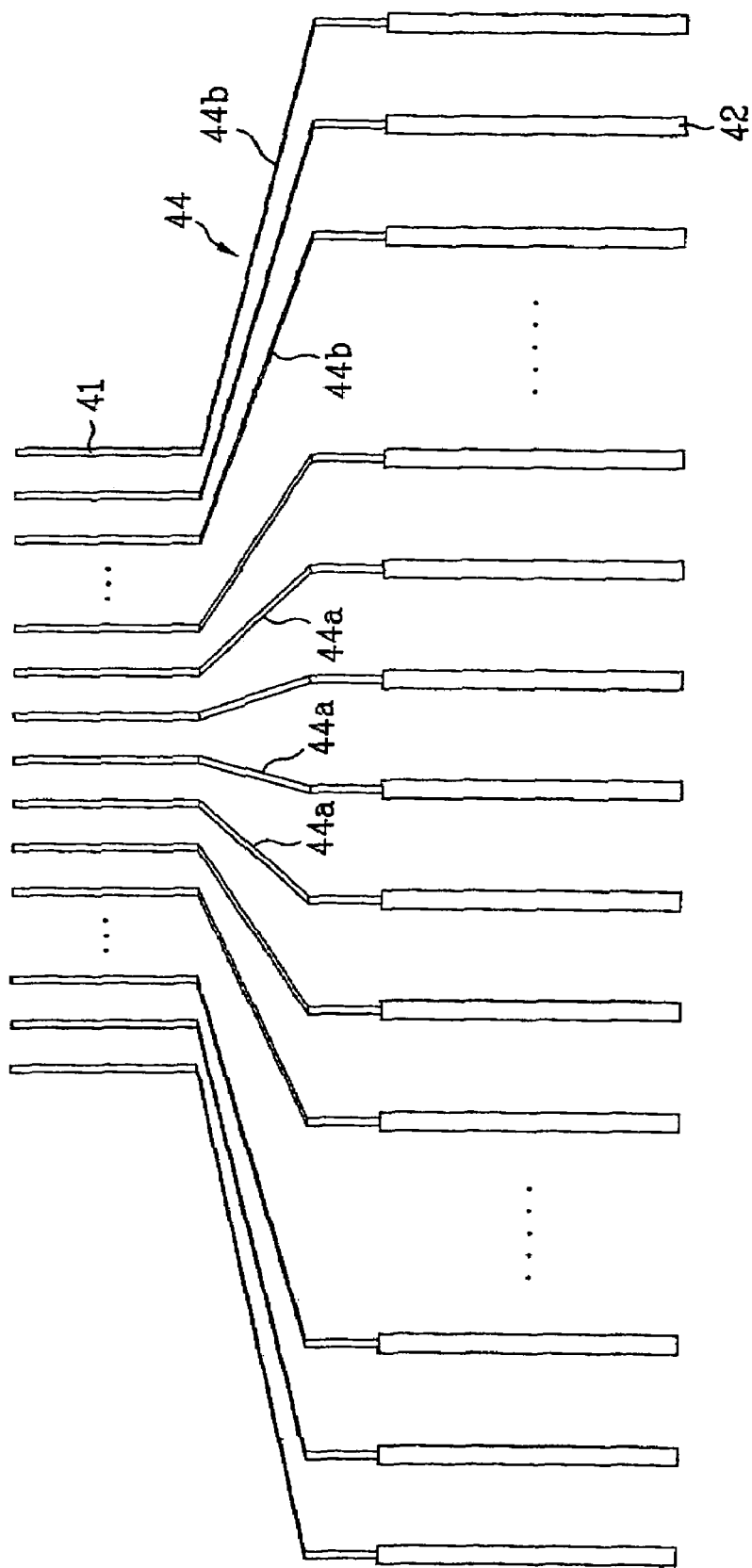
FIG. 4 illustrates a layout of an LCD device according to the first embodiment of the present invention.

FIG. 4 is a layout of an LCD device according to the first embodiment of the present invention.

As shown in FIG. 4, in a liquid crystal display (LCD) device according to the first embodiment of the present invention, interconnection lines 44a in a center portion of an interconnection line part between a driving IC 41 and a gate line or a data line 42 are thickened, so that capacitance between an interconnection line 44a in the center portion and a common electrode (not shown) of an upper substrate 45 is substantially the same as the capacitance of between an interconnection line 44b in an outer portion of the interconnection line part.

Herein, the interconnection line part generally includes an initial part connected to the driving IC; an end part connected to gate lines or data lines in a straight-line shape, and the rest middle part formed in a slanted or curved shape.

Applying the first embodiment of the present invention in which an interconnection line is thickened resulting in a greater distance between a driving IC and TFT-LCD. Accordingly, in the present invention, the interconnection lines in a part of interconnection line adjacent the data or gate line and the end part of an interconnection line part are thickened, but a part of the initial part of the interconnection line is not thickened, thereby maintaining a distance between the driving IC and TFT-LCD module in itself.

Second Embodiment

Figure 5:
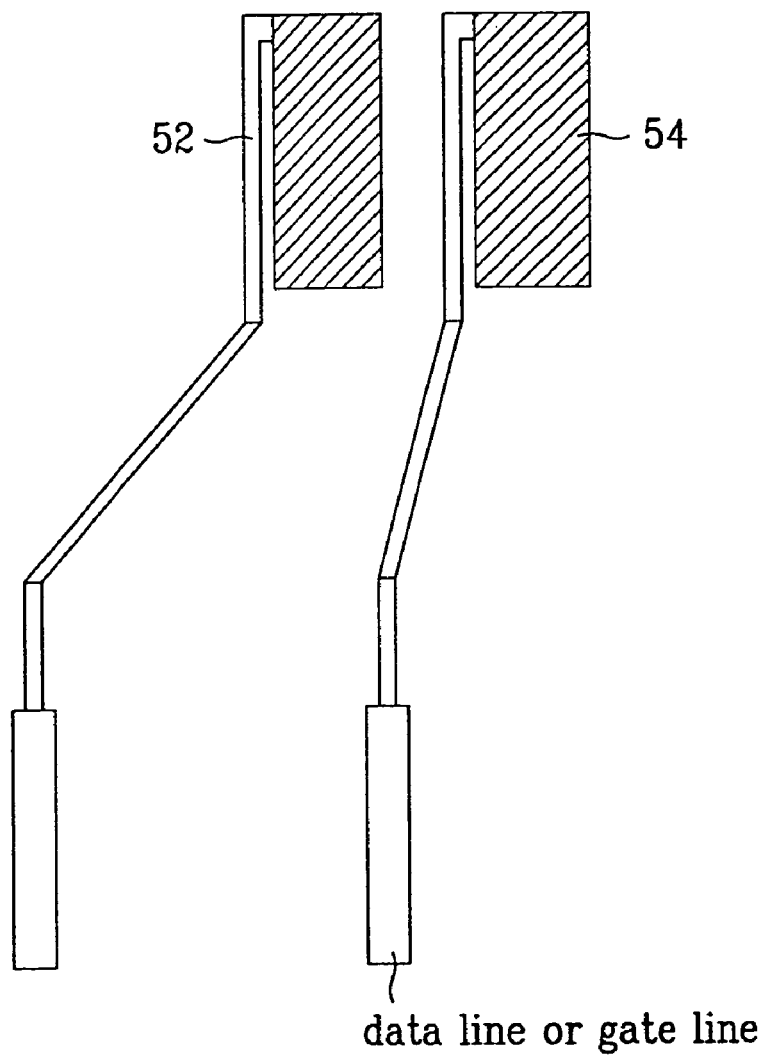
FIG. 5 illustrates an layout of an LCD device according to the -second embodiment of the present invention.

FIG. 5 is a layout of an LCD device according to the second embodiment of the present invention.

In the second embodiment of the present invention in which there is a limit to increasing a width of an interconnection line part, as shown in FIG. 5, supplementary metal patterns 54 are formed between interconnection lines 52 to be electrically connected to the interconnection lines 52. Herein, the supplementary metal pattern 54 is formed of the same material as the interconnection line, or a gate line or a data line. Also, supplementary metal patterns 54 connected to the interconnection line in a center portion of the interconnection line part can be larger size than supplementary metal patterns in outer portion of the interconnection line part.

For example, length of a supplementary metal pattern 54 in the center portion is relatively longer than supplementary metal patterns 54 in the outer portion while keeping a same width.

Third Embodiment

Figure 6:
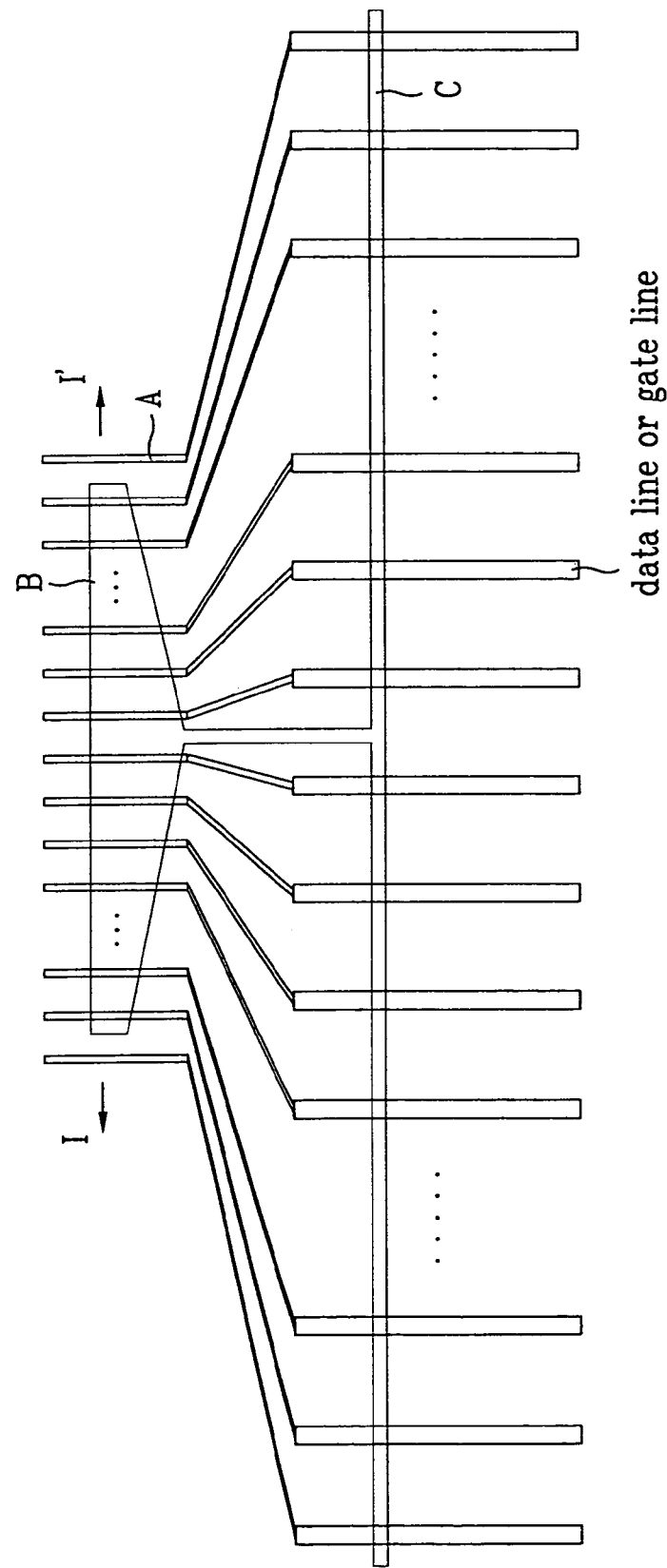
FIG. 6 illustrates a layout of an LCD device according to the third and sixth embodiments of the present invention.

FIG. 6 is a layout of an LCD device according to the third embodiment or the sixth embodiment of the present invention.

In the third and sixth embodiments of the present invention, a conductive layer B in a roughly triangle shape is formed so that a center portion of an interconnection line part A is wider than an outer portion, thereby forming a compensation capacitor between the conductive layer B and the respective interconnection lines.

For example, the center portion of a compensation capacitor formed between the interconnection lines and the conductive layer has larger capacity than the outer portion of a compensation capacitor formed between the interconnection lines and the conductive layer. Also, the conductive layer B is connected to a voltage line, for example, a common voltage line C, for preventing static electricity.

A structure of an LCD device and a method for fabricating the same according to the third embodiment of the present invention will be explained as follows.

Figure 7A:
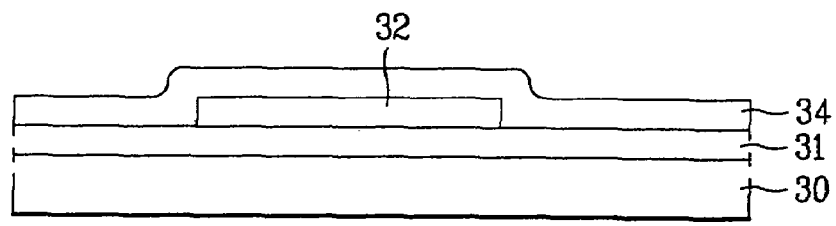
FIGS. 7A to 7C are sectional views of TFT of a cell array part of an LCD device according to the third embodiment of the present invention.
Figure 7B:
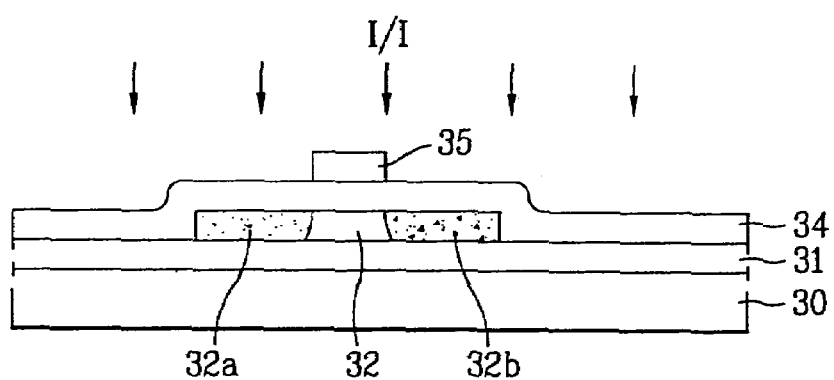
Figure 7C:
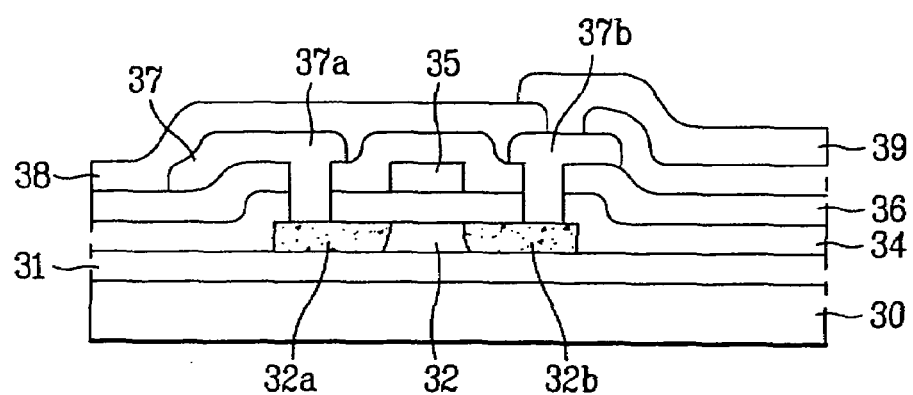
Figure 8A:
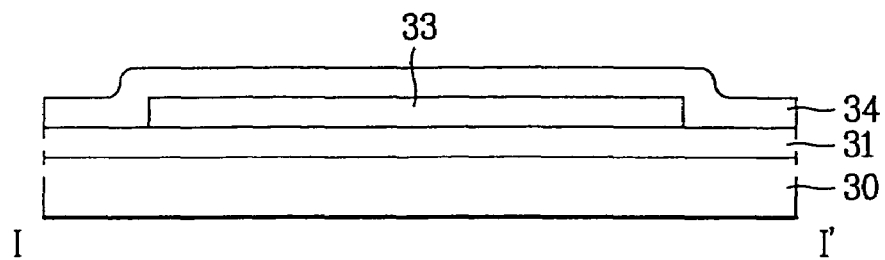
FIGS. 8A to 8C are sectional views of an LCD device according to the third embodiment of the present invention taken along line I-I' of FIG. 6.
Figure 8B:
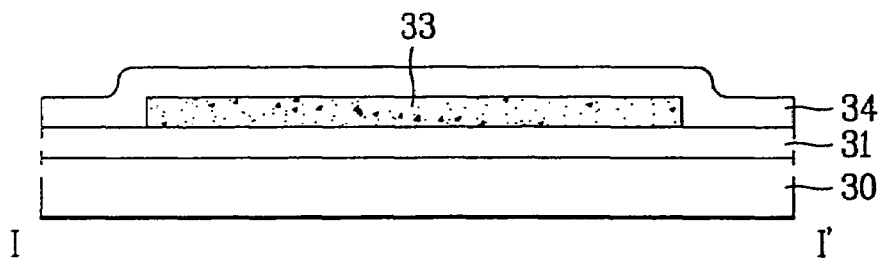
Figure 8C:
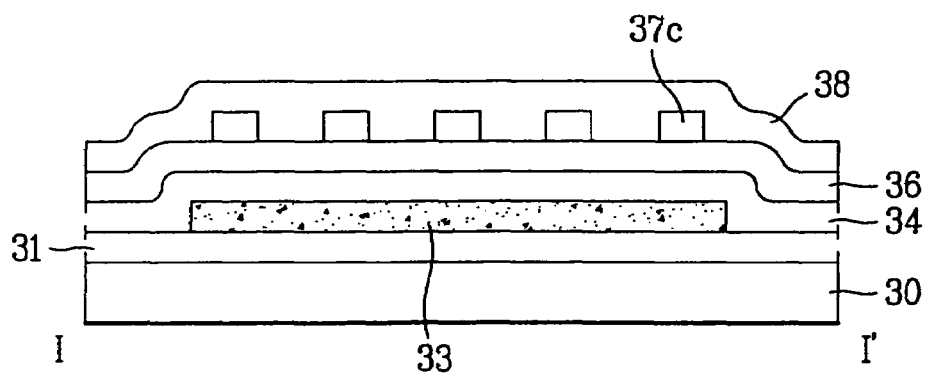

FIGS. 7A to 7C are sectional views of TFT of a cell array part of an LCD device according to the third embodiment of the present invention, and FIGS. 8A to 8C are sectional views of an LCD device according to the third embodiment of the present invention taken along line I-I' of FIG. 6.

In the third embodiment of the present invention, a compensation capacitor is formed in a data interconnecting ling part when a TFT of a cell array of an LCD device is formed as a top gate type polysilicon transistor. The compensation capacitor is formed using the conductive layer as a semiconductor layer doped with impurities.

As shown in FIGS. 7A and 8A, a buffer layer 31 is deposited on an entire surface of a glass substrate 30. A semiconductor layer, for example, polysilicon, is deposited over the buffer layer 31 and then is selectively removed, so that a first semiconductor layer 32 and a second semiconductor layer 33 are respectively formed in regions where TFTs of a cell array part will be formed and where interconnection lines will be formed. Then, a gate insulating film 34 is formed on the entire substrate 30.

As shown in FIGS. 7B and 8B, a metal layer is deposited on the entire surface and then is selectively removed, so that a gate electrode 35 is formed on a gate insulating film 34 above the first semiconductor layer 32. Then, impurity ions are implanted on the entire surface of the first and second semiconductor layers at both sides of the gate electrode 35, thereby forming impurity regions. At this time, an impurity region of the first semiconductor layer 32 at both sides of the gate electrode 35 becomes source and drain regions 32a and 32b, and an impurity region of the second semiconductor layer 33 is converted to a conductive layer.

As shown in FIGS. 7C and 8C, an interlayer insulating film 36 is formed on the entire surface of the substrate 30. Then, the gate insulating 33 and the interlayer insulating film 36 are selectively removed, so that contact holes to the source and drain regions 32a and 32b of the first semiconductor layer 32 are formed.

Subsequently, a metal layer is deposited on the entire surface and then selectively removed, so that data lines having source and drain electrodes and data interconnection lines are formed. That is, a source electrode 37a of a data line 37 extends to and is electrically connected to a source region 32a, and a drain electrode 37b is connected to a drain region 32b. Also, data interconnecting lines 37c extend from the data line.

Then, a passivation film 38 is formed on the entire surface including the data line 37 and data interconnection lines 37c including the source and drain electrodes 37a and 37b. Subsequently, a contact hole is formed to expose the drain electrode 37b, and then a pixel electrode 39 is formed in the pixel region.

Accordingly, as shown in FIG. 8C, compensation capacitors are formed between the data interconnection lines 37c and the semiconductor layer 33 without an additional mask.

Also, as shown in FIG. 6, compensation capacitors between the respective interconnection lines and the semiconductor layer has a capacitor capacitance that is greater in a center portion of the interconnection line part than in an outer portion.

Fourth Embodiment

Meanwhile, in an LCD device according to the fourth embodiment of the present invention, a metal pattern of a roughly triangle shape is formed, so that data interconnection lines in a center portion are wider than in an outer portion, thereby forming compensation capacitors between the metal pattern and the respective interconnection lines. Whereas the conductive layer is formed of a semiconductor layer doped with impurities in the third embodiment of the present invention, the conductive layer is formed of a gate metal layer in the fourth embodiment of the present invention.

An LCD device and a method for fabricating the same according to the fourth embodiment of the present invention will be explained as follows.

Figure 9A:
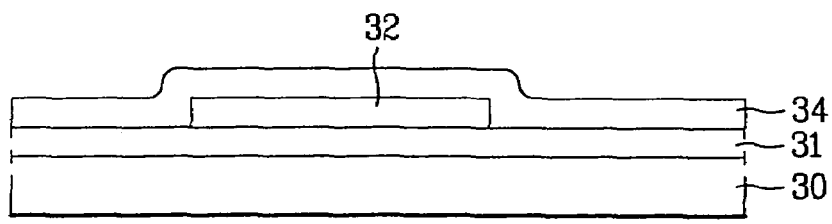
FIGS. 9A to 9C are sectional views of TFT of a cell array part of an LCD device according to the fourth embodiment of the present invention.
Figure 9B:
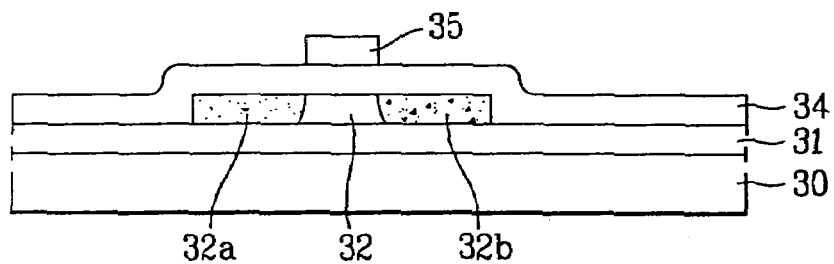
Figure 9C:
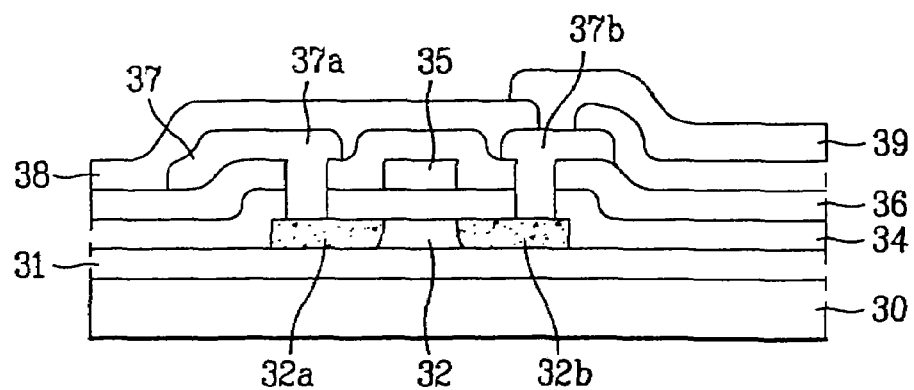
Figure 10A:
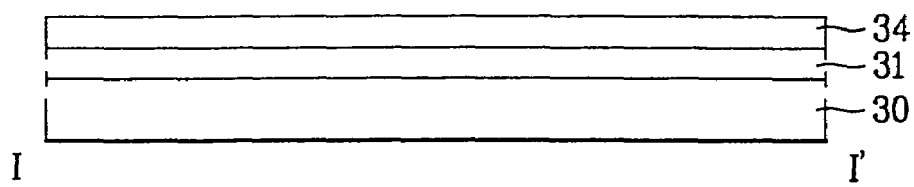
FIGS. 10A to 10C are sectional views of an LCD device according to the fourth embodiment of the present invention taken along line I-I' of FIG. 6.
Figure 10B:
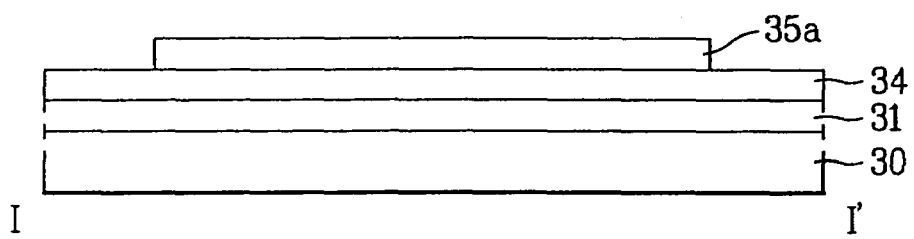
Figure 10C:
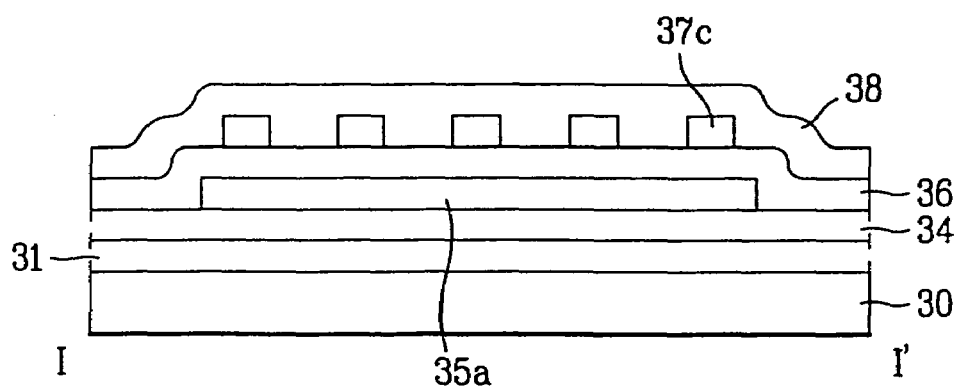

FIGS. 9A to 9C are sectional views of TFT of a cell array part of an LCD device according to the fourth embodiment of the present invention, and FIGS. 10A to 10C are sectional views of an LCD device according to the fourth embodiment of the present invention taken along line I-I' of FIG. 6.

In the fourth embodiment of the present invention, a compensation capacitor is formed of gate metal layer when the TFTs of a cell array of an LCD device are formed of top gate polysilicon transistors.

As shown in FIGS. 9A and 10A, a buffer layer 31 is deposited on an entire surface of a glass substrate 30. A semiconductor layer, for example, polysilicon, is deposited over the buffer layer 31 and then is selectively removed, so that a semiconductor layer 32 is formed in regions where TFTs of a cell array part will be formed. Then, a gate insulating film 34 is formed on the entire surface of the substrate 30.

As shown in FIGS. 9B and 10B, a metal layer is deposited on the entire surface and selectively removed, so that a gate electrode 35 on a gate insulating film 34 above the first semiconductor layer 32 and a gate metal pattern layer 35a are simultaneously formed in the interconnection line part. Then, impurity ions are implanted to the semiconductor layer 32 at both sides of the gate electrode 35, so that impurity regions are formed. At this time, impurity region of the semiconductor layer 32 at both sides of the gate electrode 35 becomes source and drain regions 32a and 32b.

As shown in FIGS. 9C and 10C, an interlayer insulating film 36 is formed on the entire surface of the substrate 30. Then, the gate insulating film 33 and the interlayer insulating film 36 are selectively removed, so that contact holes to the source and drain regions 32a and 32b of the semiconductor layer 32 are formed.

A metal layer is then deposited and selectively removed, so that data lines and data interconnection lines including source and drain electrodes are formed. That is, a source electrode 37a of a data line 37 extends to and is electrically connected to a source region 32a, and a drain electrode 37b is connected to a drain region 32b. Also, data interconnection lines 37c extend from the data line.

Subsequently, a passivation film 38 is formed on the entire surface including the data line 37 and data interconnection lines 37c including the source and drain electrodes 37a and 37b. Subsequently, a contact hole is formed to expose the drain electrode 37b, and then a pixel electrode 39 is formed in the pixel region.

Accordingly, as shown in FIG. 10C, compensation capacitors are formed between the data interconnection lines 37c and the gate metal pattern layer 35a without an additional mask. Also, as shown in FIG. 6, compensation capacitors between the respective interconnection lines and the metal pattern layer have capacitance which is greater in a center portion rather than in an outer portion.

Fifth Embodiment

Meanwhile, in an LCD device according to the fifth embodiment of the present invention when TFTs of a cell array part are formed of bottom gate type amorphous silicon TFTs, a metal pattern layer of a roughly triangle shape is formed, so that data interconnection lines in a center portion of data interconnection line part are wider than those in an outer portion, thereby forming compensation capacitors between the metal pattern and the respective interconnection lines.

An LCD device and a method for fabricating the same according to the fifth embodiment of the present invention will be explained as follows.

Figure 11A:
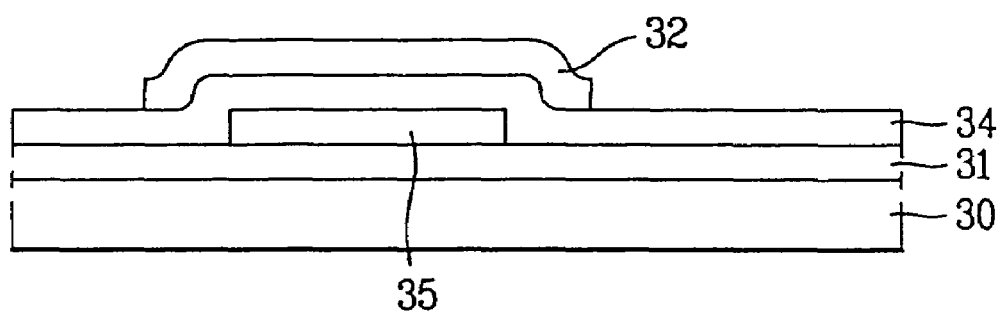
FIGS. 11A and 11b are sectional views of TFT of a cell array part of an LCD device according to the fifth embodiment of the present invention.
Figure 11B:
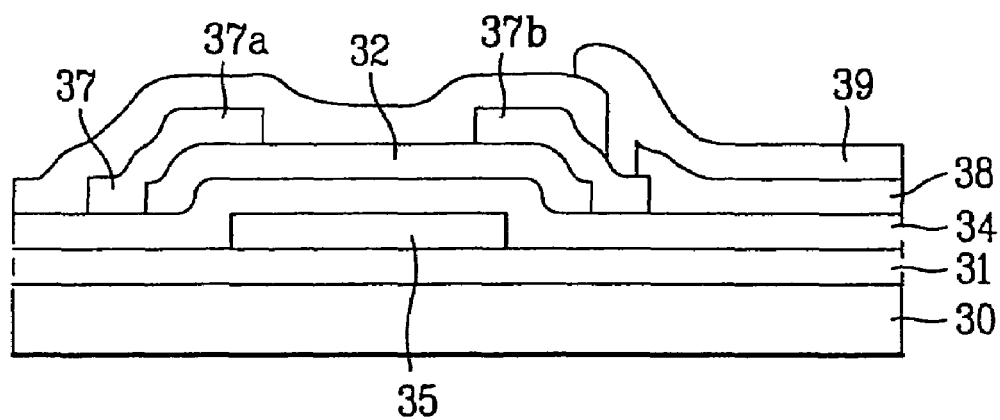
Figure 12A:
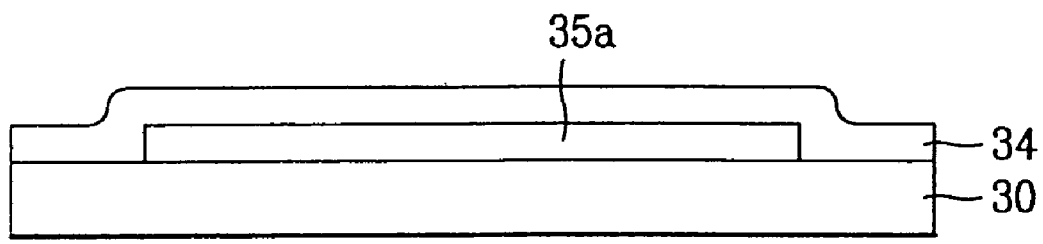
FIGS. 12A and 12B are sectional views of an LCD device according to the fifth embodiment of the present invention taken along line I-I' of FIG. 6.
Figure 12B:
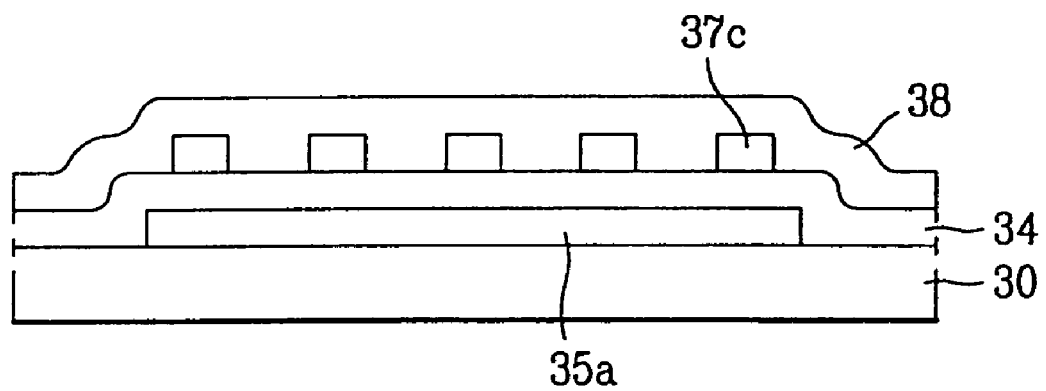

FIGS. 11A and 11B are sectional views of TFT of a cell array part of an LCD device according to the fifth embodiment of the present invention, and FIGS. 12A and 12B are sectional views of an LCD device according to the fifth embodiment of the present invention taken along line I-I' of FIG. 6.

In the fifth embodiment of the present invention, a conductive layer is formed of a gate metal layer to form compensation capacitors when the TFTs of a cell array part of an LCD device are formed of amorphous silicon transistors.

As shown in FIGS. 11A and 12A, a metal layer is deposited on an entire surface of a glass substrate 30 and then selectively removed, so that a gate electrode 35 is formed in a cell array part and a gate metal patter layer 35a is simultaneously formed in the interconnection line part. Then, an insulating film 34 is formed on the entire surface, and a semiconductor layer 32 is formed on the insulating film 34 above the gate electrode 35.

As shown in FIGS. 11B and 12B, a metal layer is deposited and selectively removed, so that a data line 37 and data interconnection lines 37c including source and drain electrodes 37a and 37b are formed. That is, a source electrode 37a of a data line 37 extends from the data line 37. A drain electrode 37b is formed opposite the source electrode 37a. Also, data interconnection lines 37c extend from the data line 37.

Subsequently, a passivation film 38 is formed on the entire surface including the data line 37 and data interconnection lines 37c including the source and drain electrodes 37a and 37b. Subsequently, a contact hole is formed to expose the drain electrode 37b, and then a pixel electrode 39 is formed in the pixel region.

Accordingly, as shown in FIG. 12B, compensation capacitors are formed between the data interconnection lines and the gate metal pattern layer 35a without an additional mask. Also, as shown in FIG. 6, compensation capacitors between the respective interconnection lines and the metal pattern layer have a capacitance that is greater in a center portion of the interconnection line part than in an outer portion.

Sixth Embodiment

In the sixth embodiment of the present invention, as aforementioned, a conductive layer of a roughly triangle shape having a wider area in a center portion of an interconnection line part than in an outer portion of the interconnection line part is formed, thereby forming compensation capacitors between the conductive layer and the respective interconnection lines. In the sixth embodiment of the present invention, the conductive layer is formed of a metal for forming the data line.

An LCD device and a method for fabricating the same according to the sixth embodiment of the present invention will be explained as follows.

Figure 13A:
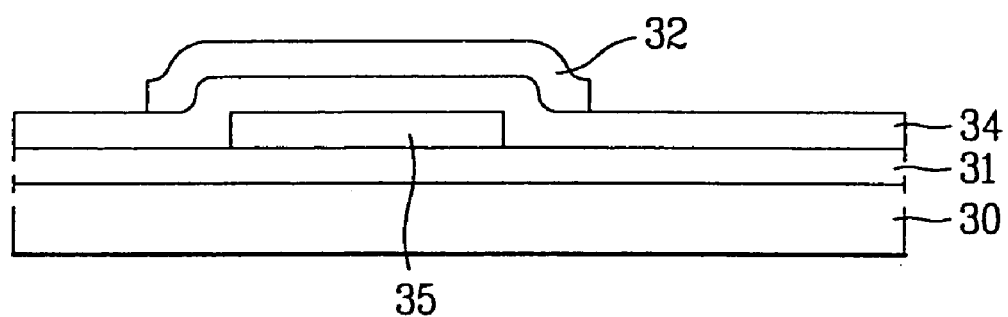
FIGS. 13A to 13B are sectional views of TFT of a cell array part of an LCD device according to the sixth embodiment of the present invention.
Figure 13B:
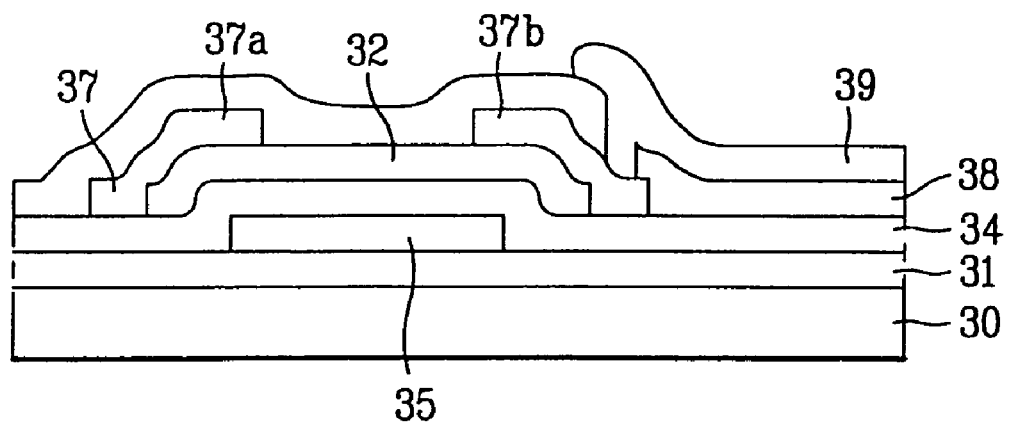
Figure 14A:
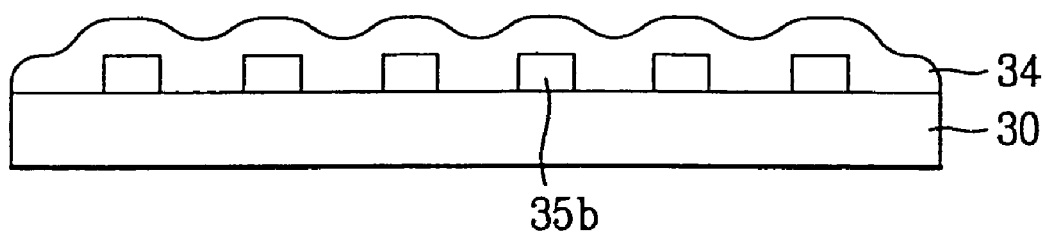
FIGS. 14A and 14B are sectional views of an LCD device according to the sixth embodiment of the present invention taken along line I-I' of FIG. 6.
Figure 14B:
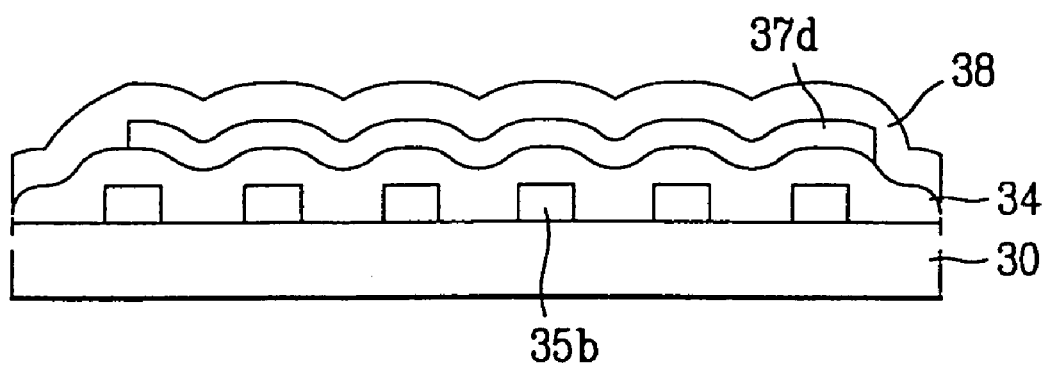

FIGS. 13A to 13B are sectional views of TFT of a cell array part of an LCD device according to the sixth embodiment of the present invention; and FIGS. 14A and 14B are sectional views of an LCD device according to the sixth embodiment of the present invention taken along line I-I' of FIG. 6.

In the sixth embodiment of the present invention, compensation capacitors are formed of a data line metal layer when the TFTs of a cell array of an LCD device are a top gate type or a bottom gate type. Herein, an example in which bottom gate typed TFTs are formed will be explained and an example in which top gate typed TFTs are formed will be omitted since it is possible to analogize from the sixth embodiment or combination of the fourth and fifth embodiments of the present invention.

As shown in FIGS. 13A and 14A, a metal layer is deposited on an entire surface of a glass substrate 30 and then selectively removed, so that a gate electrode 35 is formed in a cell array part and a gate interconnection lines 35b are formed in the interconnection line part. Then, an insulating film 34 is formed on the entire surface, and a semiconductor layer 32 is formed on the gate insulating film 34 above the gate electrode 35.

As shown in FIGS. 13B and 14B, a metal layer is deposited on the entire surface and then selectively removed, so that a data line 37 and source and drain electrodes 37a and 37b are formed at both sides of the semiconductor layer 32, and a data metal pattern 37d is formed at the interconnection line part. That is, a source electrode 37a of a data line 37 extends from the data line 37 and a drain electrode 37b is formed opposite the source electrode 37a. Also, the data metal pattern 37d is overlapped with gate interconnection lines 35b.

Subsequently, a passivation film 38 is formed on the entire surface including the data line 37 and data interconnection lines 37c including the source and drain electrodes 37a and 37b. Then, a contact hole is formed to expose the drain electrode 37b, and then a pixel electrode 39 is formed in the pixel region.

Accordingly, as shown in FIG. 14B, compensation capacitors are formed between the gate interconnection lines 35b and the metal pattern layer 37d without an additional mask. Also, as shown in FIG. 6, compensation capacitors between the respective interconnection lines and the metal pattern layer have a capacitance that is greater in a center portion of the interconnection line part than an outer portion.

Seventh Embodiment

In the seventh embodiment of the present invention, an additional metal pattern is formed between the interconnection lines (gate interconnection lines or data interconnection lines).

In FIG. 6, since there is a limit of a width between the interconnection lines, a supplementary metal pattern is formed between the interconnection lines. The supplementary metal pattern is formed of the same material as that of the respective interconnection lines and is electrically connected to the respective interconnection lines, thereby better compensating a capacitance.

Figure 15:
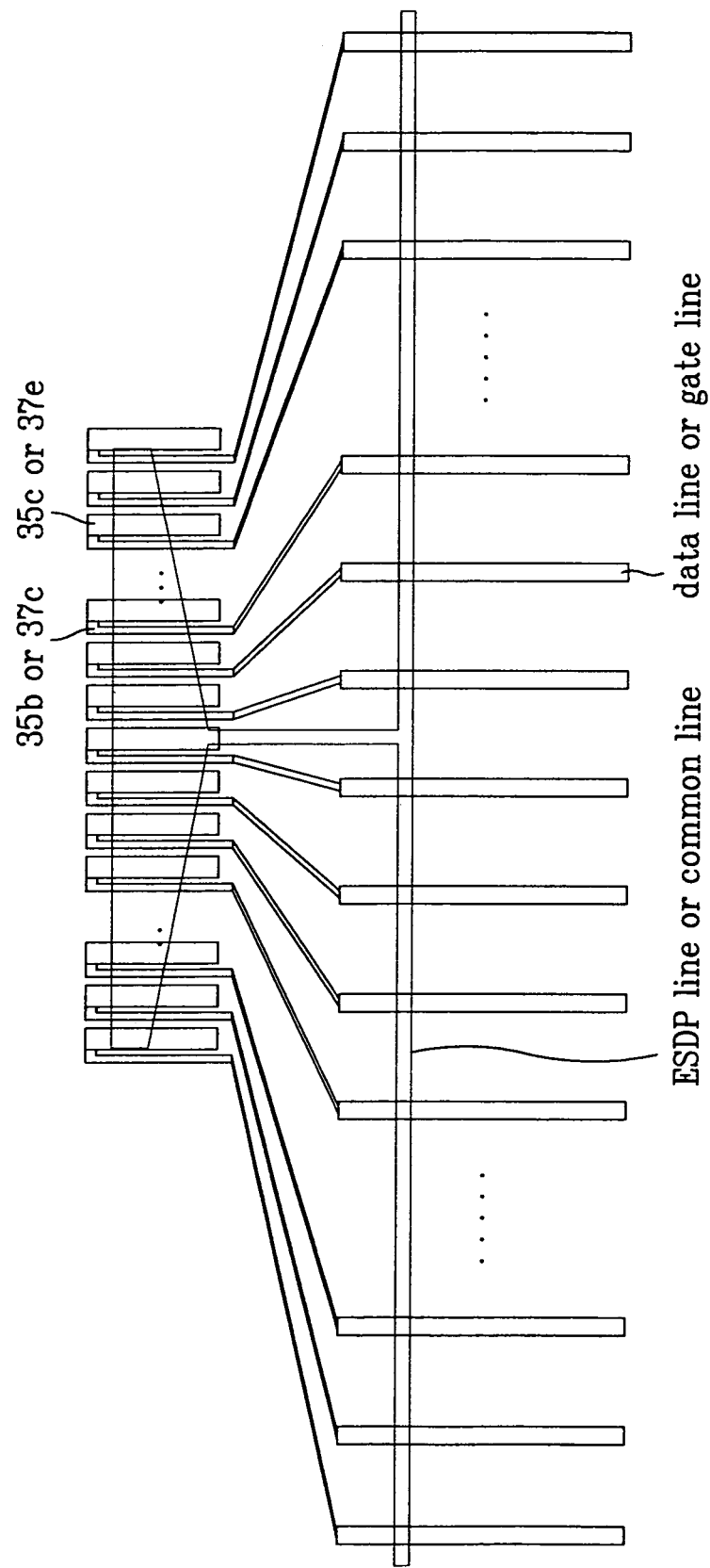
FIG. 15 is a layout of an LCD device according to the seventh embodiment of the present invention.

FIG. 15 is a layout of an LCD device according to the seventh embodiment of the present invention and is used herein to explain the present embodiment for use with gate interconnection lines 35b and data interconnection lines 37e.

In the seventh embodiment of the present invention, supplementary metal patterns (supplementary lines) 35c or 37e of the same materials as the gate interconnection lines 35b and data interconnection lines 37c are formed between gate interconnection lines 35b or between data interconnection lines 37c. The respective supplementary metal patterns 35c or 37e are electrically connected to adjacent interconnection lines 35b or 37c and formed with the same area. Also, a conductive layer B of a roughly triangle shape has a larger area in a center portion of the interconnecting line part than in an outer portion of the interconnecting line part, so that a compensation capacitor is formed among the conductive layer B, the interconnection lines, and the supplementary metal patterns 35c or 37e. Herein, the conductive layer is formed with the same method explained in the third and sixth embodiments of the present invention.

That is, the compensation capacitor in a center portion of the interconnection line part between the interconnection lines, the supplementary metal patterns, and the conductive layer has greater capacitance than in an outer portion of the interconnection line part.

Also, voltage for preventing static electricity or a common voltage is applied to the conductive layer in each embodiment.

An LCD device according to the present invention has the following advantages.

First, in the related art an uneven picture image is generated by different capacitance of static electricity that results from different lengths of each interconnection line. In the present invention, the different capacitance of static electricity is overcome. To this end, the thickness of the interconnection lines is different for interconnection lines in different portions of the interconnecting line part, or supplementary metal patterns of the different sizes are additionally formed, or a separate conductive layer is formed in the interconnection line part to compensate the different capacitance of static electricity, thereby solving the problem of uneven picture image.

Second, since a conductive layer corresponding to an interconnection line for forming the compensation capacitor is formed of active layer of TFTs or materials of gate electrode and data electrode, an additional mask is not required.

Third, the compensation capacitor is formed between each interconnection line and a conductive layer, in which a gate insulating film or an interlayer insulating film is formed, thereby obtaining a greater compensation capacitance.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A liquid crystal display device comprising:
a plurality of interconnection lines for applying a signal from a driving circuit to a liquid crystal display panel; and
a plurality of supplementary conductive patterns between the interconnection lines and connected with respective ones of interconnection lines,
wherein the interconnection lines are in an interconnection line region having a center portion and an outer portion and wherein the supplementary conductive patterns connected to the interconnection lines in the center portion have a larger area than the supplementary conductive patterns connected to the interconnection lines in the outer portion.

2. The liquid crystal display device as claimed in claim 1, wherein the supplementary conductive patterns are of the same materials as gate lines or data lines of the liquid crystal display panel.

3. The liquid crystal display device as claimed in claim 1, wherein each of the interconnection lines includes a straight line part and a slanted part, and wherein the supplementary conductive patterns are connected to the straight line parts of the respective ones of the interconnection lines.

4. The liquid crystal display device as claimed in claim 1, wherein each of the interconnection lines includes a straight line part and a slanted part, and wherein the supplementary conductive patterns are connected to the slanted parts of the respective ones of the interconnection lines.

5. A liquid crystal display device having an interconnection line part for applying a signal from a driving circuit to a liquid crystal display panel, comprising:
a substrate;
a conductive layer on the substrate, the conductive layer being wider at a center portion of the interconnection line part than in an outer portion of the interconnection line part and the conductive layer being electrically connected to a voltage line;
an insulating film on the conductive layer; and
a plurality of interconnection lines on the insulating film, the interconnection lines overlapping the conductive layer.

6. The liquid crystal display device as claimed in claim 5, wherein a plurality of capacitors are formed between the plurality of interconnection lines and the conductive layer, and capacitance of the capacitors between a respective interconnection line and the conductive layer is greater at the center portion than at the outer portion.

7. The liquid crystal display device as claimed in claim 6, wherein the capacitances of the capacitors between the respective interconnection lines and the conductive layer gradually increases from the outer portion to the center portion.

8. The liquid crystal display device as claimed in claim 5, wherein a voltage for preventing static electricity is applied to the conductive layer.

9. The liquid crystal display device as claimed in claim 5, wherein a common voltage is applied to the conductive layer.

10. The liquid crystal display device as claimed in claim 5, wherein the conductive layer is formed of a semiconductor layer doped with impurities.

11. The liquid crystal display device as claimed in claim 5, wherein the conductive layer is formed in a roughly triangle shape, so that the conductive layer overlapped with the interconnection line at an outer portion of the interconnection line part has a smaller area than at a center portion of the interconnection line part.

12. The liquid crystal display device as claimed in claim 5, wherein the insulating film has a double structure of a gate insulating film and an interlayer insulating film.

13. The liquid crystal display device as claimed in claim 5, further comprising a plurality of supplementary lines between the interconnection lines and electrically connected with respective interconnection lines.

14. The liquid crystal display device as claimed in claim 13, wherein the plurality of supplementary lines are formed of the same materials as the interconnection lines.

15. The liquid crystal display device as claimed in claim 13, wherein the plurality of supplementary lines are formed with the same size as one another.

16. The liquid crystal display device as claimed in claim 5, wherein the interconnection lines are data interconnection lines.

17. The liquid crystal display device as claimed in claim 5, wherein the conductive layer is formed of the same material as a gate line of the liquid crystal display panel.

18. The liquid crystal display device as claimed in claim 5, wherein each of the interconnection lines includes a straight line part and a slanted part, and wherein the conductive layer overlaps the straight line parts of the interconnection lines.

19. The liquid crystal display device as claimed in claim 5, wherein each of the interconnection lines includes a straight line part and a slanted part, and wherein the conductive layer overlaps the slanted parts of the interconnection lines.

20. A liquid crystal display device having an interconnection line part for applying a signal from a driving circuit to a liquid crystal display panel, comprising:
    a substrate;
    a plurality of interconnection lines on the substrate;
    an insulating film on the plurality of interconnection lines; and
    a conductive layer on the insulating film, the conductive layer having a larger area at a center portion of the interconnection line part than at an outer portion of the interconnection line part.

21. The liquid crystal display device as claimed in claim 20, wherein a voltage for preventing static electricity is applied to the conductive layer.

22. The liquid crystal display device as claimed in claim 20, wherein a common voltage is applied to the conductive layer.

23. The liquid crystal display device as claimed in claim 20, wherein the interconnection lines are gate interconnection lines, and the conductive layer is formed of the same material as that of a data line of the liquid crystal display panel.

24. The liquid crystal display device as claimed in claim 20 further comprising a plurality of supplementary lines electrically connected to respective interconnection lines.

25. A method for fabricating a liquid crystal display device having a data interconnection line part for applying a signal from a driving circuit to a liquid crystal display panel; and a cell array part in which a plurality of gate lines cross a plurality of data lines to define a pixel region, and thin film transistors (TFTs) are formed at the crossing of the gate and data lines, comprising:
    forming a plurality of gate lines having gate electrodes in the region where the TFTs are formed and simultaneously forming a gate metal pattern layer having a larger area in a center portion of the data interconnection line part than in an outer portion of the data interconnection line part;
    forming a gate insulating film on the entire surface including the gate line and the gate metal pattern layer;
    forming an active layer in an island shape in the region where the respective TFTs are formed; and
    forming a plurality of data lines and data interconnection lines substantially perpendicular to the gate lines, so that source and drain electrodes are formed on both sides of the active layer, and a capacitance between the data interconnection lines and the gate metal pattern layer is gradually increased towards the center portion of the data interconnection line part from the outer portion of the data interconnection line part.

26. The method as claimed in claim 25, further comprising forming a plurality of supplementary lines of the same material as the data interconnection lines so as to be electrically connected to respective data interconnection lines.

27. A method for fabricating a liquid crystal display device having a data interconnection line part for applying a signal from a driving circuit to a liquid crystal display panel; and a cell array part in which a plurality of gate lines cross a plurality of data lines to define a pixel region, and thin film transistors (TFTs) having source and drain electrodes are formed at the crossing of the gate and data lines, comprising:
    forming an active layer in the region where the TFTs are formed;
    forming a gate insulating film on the entire surface of the substrate;
    forming a plurality of gate lines on the gate insulating film at the cell array part and forming a gate metal pattern layer on the gate insulating film at the data interconnection line part, so that a gate electrode is formed above the active layer, and so that a first width of the gate metal pattern at a center portion of the data interconnection line part is greater than a second width of the gate metal pattern at an outer portion of the data interconnection line part;
    forming an impurity region in the active layer using the gate electrode as a mask, and forming an interlayer insulating film on the entire surface including the gate line and the gate metal pattern layer so as to form a contact hole in the impurity region; and
    forming a plurality of data and data interconnection lines substantially perpendicular to the gate lines, so that source and drain electrodes are connected to the impurity region through the contact hole, and a capacitance with the gate metal pattern layer is gradually increased towards the center portion from the outer portion.

28. The method as claimed in claim 27, further comprising forming a plurality of supplementary lines of the same material as the data interconnection lines so as to be electrically connected to respective data interconnection lines.

29. A method for fabricating a liquid crystal display device having a gate interconnection line part for applying a signal from a driving circuit to a liquid crystal display panel; and a cell array part in which a plurality of gate lines cross a plurality of data lines to define a pixel region, and thin film transistors (TFTs) are formed at the crossing of the gate and data lines, comprising:
    forming an active layer in the region where the TFTs are formed;
    forming a gate insulating film on the entire surface of the active layer;
    forming a plurality of gate lines and gate interconnection lines on the gate insulating film so as to form a gate electrode on the active layer;
    forming an impurity region in the active layer using the gate electrode as a mask, and forming an interlayer insulating film on the entire surface including the gate lines and the gate interconnection lines so as to form a contact hole in the impurity region; and forming a plurality of data lines substantially perpendicular to the gate lines to connect source and drain electrodes to the impurity region through the contact hole, and simultaneously forming a data metal pattern layer to overlap the gate interconnection lines, so that a first width of the data metal pattern layer at a center portion of the gate interconnection line part is greater than a second width of the data metal pattern layer at an outer portion of the gate interconnection line part.

30. The method as claimed in claim 29, further comprising forming a plurality of supplementary lines of the same material the gate interconnection lines so as to be electrically connected to respective gate interconnection lines.

31. A method for fabricating a liquid crystal display device having a gate interconnection line part for applying a signal from a driving circuit to a liquid crystal display panel; and a cell array part in which a plurality of gate lines cross a plurality of data lines to define a pixel region, and thin film transistors (TFTs) are formed at the crossing of the gate and data lines, comprising:

forming a plurality of gate lines and gate interconnection lines having gate electrodes in the region where the TFTs are formed;

forming a gate insulating film on the entire surface including the gate lines and the gate interconnection lines;

forming an active layer in an island shape in the region where the TFTs are formed; and forming a plurality of data lines substantially perpendicular to the gate lines to form source and drain electrodes on both sides of the active layer, and simultaneously forming a data metal pattern layer to overlap the gate interconnection lines, so that a first width of the data metal pattern layer at a center portion of the gate interconnection line part is greater than a second width of the data metal pattern layer at an outer portion of the gate interconnection line part.

32. The method as claimed in claim 31, further comprising forming a plurality of supplementary lines of the same material as the gate interconnection lines so as to be electrically connected to the gate interconnection lines.

* * * * *